United States Patent
Mohseni et al.

(10) Patent No.: US 9,467,975 B2
(45) Date of Patent: Oct. 11, 2016

(54) SYSTEM AND METHODS FOR CANCELLING UPLINK TRAFFIC CHANNEL BURSTS TO IMPROVE PERFORMANCE IN A MULTI-SIM WIRELESS COMMUNICATION DEVICE

(71) Applicant: QUALCOMM Incorporated, San Diego, CA (US)

(72) Inventors: Jafar Mohseni, San Diego, CA (US); Neha Goel, Surrey (GB); Mungal Singh Dhanda, Slough (GB); Divaydeep Sikri, Woking (GB)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 14/538,949

(22) Filed: Nov. 12, 2014

(65) Prior Publication Data

US 2016/0095087 A1    Mar. 31, 2016

Related U.S. Application Data

(60) Provisional application No. 62/056,928, filed on Sep. 29, 2014.

(51) Int. Cl.
| | |
|---|---|
| *H04W 24/00* | (2009.01) |
| *H04W 72/02* | (2009.01) |
| *H04W 24/08* | (2009.01) |
| *H04W 88/06* | (2009.01) |
| *H04W 72/12* | (2009.01) |
| H04W 24/02 | (2009.01) |

(52) U.S. Cl.
CPC ............. *H04W 72/02* (2013.01); *H04W 24/08* (2013.01); *H04W 72/1215* (2013.01); *H04W 88/06* (2013.01); H04W 24/02 (2013.01)

(58) Field of Classification Search
CPC ............. H04W 72/082; H04W 24/02; H04W 28/0289; H04W 52/0209; H04W 72/085; H04W 88/06; H04W 24/10; H04W 28/06; H04W 4/06; H04W 52/02; H04W 52/146; H04W 72/0413; H04W 72/12; H04W 28/02; H04W 28/12; H04W 72/02; H04W 72/1215; H04L 1/0027; H04L 47/12; H04L 12/66; H04L 1/0026; H04L 5/0092; H04L 2012/5632; H04L 2012/5634

USPC ......... 455/63.1, 13.1, 450, 67.13, 140, 337, 455/435.1, 509, 515, 558; 370/329, 335, 370/236, 341, 345, 352, 389, 390
See application file for complete search history.

(56) References Cited

U.S. PATENT DOCUMENTS

| | | |
|---|---|---|
| 2006/0050666 A1 | 3/2006 | Odenwalder |
| 2012/0263047 A1 | 10/2012 | Love et al. |
| 2012/0314610 A1 | 12/2012 | Hou |
| 2014/0038569 A1 | 2/2014 | Chin et al. |
| 2014/0120925 A1 | 5/2014 | Kanthala et al. |
| 2014/0199993 A1 | 7/2014 | Dhanda et al. |
| 2014/0200046 A1 | 7/2014 | Sikri et al. |
| 2014/0213235 A1 | 7/2014 | Lou et al. |

FOREIGN PATENT DOCUMENTS

| | | |
|---|---|---|
| GB | 2492577 A | 1/2013 |
| WO | 2014113484 A1 | 7/2014 |

OTHER PUBLICATIONS

International Search Report and Written Opinion—PCT/US2015/047710—ISA/EPO—Nov. 30, 2015.

*Primary Examiner* — Fred Casca
(74) *Attorney, Agent, or Firm* — The Marbury Law Group, PLLC (57) ABSTRACT

Methods and devices are disclosed for enabling improved performance on a single-transmit multi-SIM wireless communication device. The wireless communication device may detect a voice communication on a modem stack associated with the first SIM and a data communication on a modem stack associated with the second SIM. The wireless communication device may identify a data rate used by the voice codec to encode uplink traffic channel (TCH) bursts in the voice communication, and determine whether the identified data rate used by the voice codec permits TCH burst cancellation. If it is determined that the identified data rate used by the voice codec permits TCH burst cancellation, the wireless communication device may downgrade a portion of the uplink TCH bursts scheduled on the modem stack associated with the first SIM.

26 Claims, 7 Drawing Sheets

SYSTEM AND METHODS FOR CANCELLING UPLINK TRAFFIC CHANNEL BURSTS TO IMPROVE PERFORMANCE IN A MULTI-SIM WIRELESS COMMUNICATION DEVICE

RELATED APPLICATIONS

This application claims the benefit of priority to U.S. Provisional Application No. 62/056,928 entitled System and Methods for Cancelling Uplink Traffic Channel Bursts to Improve Performance in a Multi-SIM Wireless Communication Device, filed Sep. 29, 2014, the entire contents of which are incorporated herein by reference.

BACKGROUND

Multi-SIM (subscriber identification module) wireless devices have become increasing popular because of their flexibility in service options and other features.

In various types of multi-SIM wireless communication devices, each modem stack associated with a subscription may store information provisioned by its respective network operator in a SIM, which may allow the SIM to support use of various different communication services. For example, various wireless networks may be configured to handle different types of data, use different communication modes, implement different radio access technologies, etc. One type of multi-SIM wireless device, referred to as a dual-SIM dual-active (DSDA) device, is typically configured with separate transmit/receive chains associated with each SIM, thereby allowing simultaneous active connections with the networks corresponding to two SIMs. Some DSDA devices, referred to as single-transmit DSDA devices, are configured with separate receive chains associated with each SIM, but a single shared transmit chain. The single-transmit configuration reduces hardware costs and power requirements of the wireless communication device.

Except for simultaneous voice calls (which cause one call being placed on hold while the other remains in the active state), a single-transmit DSDA device may typically participate in active communication activities on both SIMs. For example, the DSDA device may be involved in an active voice call on a first SIM while participating in an active data session on the other SIM. Therefore, conflicts can frequently arise between the activities on two SIMs, for example, due to scheduling simultaneous use of the shared transmit chain by both SIMs and/or simultaneous transmit and receive activity respectively associated with a first and second SIM. Typically, these conflicts are resolved based on a default prioritization of one or more particular communication types (e.g., an active voice call). However, after many conflicts, the network connection for the non-prioritized communication activity may be degraded, thereby harming overall performance of the wireless communication device. Further, since increased efforts may be required on the wireless communication device to maintain the non-prioritized communication connection, power consumption may be increased. As a result, one or multiple transmit and/or receive activities in the non-prioritized communication may be dropped, delayed, or degraded increasing power consumption and harming performance of the wireless communication device.

SUMMARY

Systems, methods, and devices of various embodiments enable a multi-SIM wireless communication device on which at least a first SIM and second SIM are respectively associated with a first radio frequency (RF) receive resource and a second RF receive resource, to improve performance when a voice communication is detected on a modem stack associated with the first SIM and a data communication is detected on a modem stack associated with the second SIM. Various embodiments may include identifying a data rate used by a voice codec to encode uplink traffic channel (TCH) bursts in the voice communication, determining whether the identified data rate used by the voice codec permits TCH burst cancellation, and downgrading a portion of the uplink TCH bursts scheduled on the modem stack associated with the first SIM in response to determining that the identified data rate used by the voice codec permits TCH burst cancellation. Various embodiments may also include identifying a next downgraded uplink TCH burst scheduled on the modem stack associated with the first SIM, determining whether the identified downgraded uplink TCH burst conflicts with the data communication on the modem stack associated with the second SIM, and detecting radio conditions of the serving cell for the voice communication in response to determining that the identified downgraded uplink TCH burst conflicts with the data communication on the modem stack associated with the second SIM.

Various embodiments may also include determining whether the detected radio conditions of the serving cell for the voice communication indicate a signal strength above a minimum value, and cancelling the identified downgraded uplink TCH burst in response to determining that the detected radio conditions of the serving cell for the voice communication indicate a signal strength above the minimum value. In some embodiment systems, methods and devices, cancelling the identified downgraded uplink TCH burst may enable activity in the data communication on the modem stack associated with the second SIM.

Various embodiments may also include allowing normal transmission of the identified downgraded uplink TCH burst in response to determining that the detected radio conditions of the serving cell for the voice communication indicate a signal strength that is not above the minimum value. Various embodiments may also include tracking each handover triggered for the voice communication, identifying a threshold number of handovers and a preset time duration, and disabling cancellation of uplink TCH bursts for the remainder of the voice communication in response to determining that the count of handovers triggered for the voice communication within the preset time duration is greater than or equal to a threshold number.

In some embodiment systems, methods and devices, the portion of the uplink TCH bursts may be a selected one out of every four uplink TCH bursts of the voice communication. In some embodiment systems, methods and devices, the portion of the uplink TCH bursts may be a selected one uplink TCH burst out of every 5-8 uplink TCH bursts of the voice communication. In some embodiment systems, methods and devices, the portion of the uplink TCH bursts may be based on a random selection. In some embodiment systems, methods and devices, the portion of the uplink TCH bursts may be based on a fixed periodic selection.

In some embodiment systems, methods and devices, determining whether the identified downgraded uplink TCH burst conflicts with the data communication on the modem stack associated with the second SIM may include identifying transmit and receive activities of the data communication scheduled on the modem stack associated with the second SIM, determining whether any scheduling collisions will occur, and determining whether receiver desense will occur. In some embodiment systems, methods and devices, determining whether any scheduling collisions will occur may include determining whether any identified transmit activity is scheduled to occur at the same time as the identified downgraded uplink TCH burst, in which the first and second SIMs may be associated with a shared RF transmit resource. In some embodiment systems, methods and devices, determining whether receiver desense will occur may include determining whether any identified receive activity is scheduled to occur at the same time as the identified downgraded uplink TCH burst.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the invention or the claims.

The various embodiments improve performance of a multi-SIM multi-active (MSMA) wireless communication device engaged in simultaneous voice and data communications by permitting, in favorable radio link conditions, cancellation of a portion of the uplink traffic channel (TCH) data bursts of the voice communication if they conflict with the data communication. In various embodiments, when a first SIM is engaged in a high priority communication (e.g., a voice call), some of the uplink data transmissions may be downgraded. When radio conditions for the voice call are sufficiently high, downgraded uplink data transmissions that conflict with transmit or receive activities on another SIM may be cancelled (i.e., blanked).

The terms "wireless device" and "wireless communication device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "SIM," "SIM card," and "subscriber identification module" are used interchangeably to mean a memory that may be an integrated circuit or embedded into a removable card, which stores an International Mobile Subscriber Identity (IMSI), related key, and/or other information used to identify and/or authenticate a wireless device on a network. The term SIM may also be used as shorthand reference to a communication network associated with a particular SIM, since the information stored in a SIM enables the wireless device to establish a communication link with a particular network, thus the SIM and the communication network, as well as the services and subscriptions supported by that network, correlate to one another.

As used herein, the terms "multi-SIM wireless communication device," "multi-SIM wireless device," "dual-SIM wireless communication device," "dual-SIM dual-active device," and "DSDA device" are used interchangeably to describe a wireless device that is configured with more than one SIM and is capable of independently handling communications with networks of all subscriptions.

As used herein, the terms "wireless network," "cellular network," "system," "public land mobile network," and "PLMN" are used interchangeably to describe a wireless network of a carrier associated with a wireless device and/or subscription on a wireless device, and/or its roaming partners.

Wireless communication networks are widely deployed to provide various communication services such as voice, packet data, broadcast, messaging, and so on. These wireless networks may be capable of supporting communication for multiple users by sharing the available network resources. Examples of such wireless networks include Global System for Mobile Communications (GSM), Code Division Multiple Access (CDMA) networks, Time Division Multiple Access (TDMA) networks, and Frequency Division Multiple Access (FDMA) networks. These wireless networks may also utilize various radio technologies such as Wideband-CDMA (W-CDMA), CDMA2000, Global System for Mobile Communications (GSM), etc.

In current mobile communications, wireless service carriers have standardized a number of techniques for selecting wireless communications systems and obtaining service therefrom, in accordance with preferences of the subscriber's service provider/carrier. Service providers generally enable subscribers to access a network by providing provisioning information to subscriber devices. For clarity, the embodiments are described below for GSM-type and/or UMTS-type networks, but may be applied to networks using any other radio technology or protocol.

An example GSM network may operate on any of a number of GSM bands (e.g., GSM 900, GSM 850, etc.), each of which cover multiple radio frequency (RF) channels identified by absolute radio frequency channel numbers (ARFCNs). The ARFCNs for various GSM bands are given in 3GPP TS 05.05, entitled "Digital cellular telecommunications system (Phase 2+); Radio transmission and reception (Release 1999)." Further, each GSM network typically operates on a specific set of RF channels in a specific GSM band. In describing various embodiments, the terms "channel," "frequency," and "ARFCN" may be used interchangeably and may refer to channels in GSM bands, and/or channels in other network bands (i.e., UARFCNs for UMTS networks, etc.).

A multi-SIM wireless device that supports two or more SIM cards may have a number of capabilities that provide convenience to a user, such as allowing different wireless carriers, plans, telephone numbers, billing accounts, etc. on one device. Developments in multi-SIM wireless communication device technology have led to a variety of different options for such devices. For example, an "active dual-SIM" wireless device allows two SIMs to remain active and accessible to the device. In particular, a type of active dual-SIM wireless communication device may be a "dual-SIM dual-active" (DSDA) wireless device in which two SIMs are configured to use separate transmit and/or receive circuitries (i.e., RF resources). Thus, in some DSDA devices, the SIMs may simultaneously operate in any of a variety of modes, such as active/connected mode (i.e., transmitting and/or receiving data), idle mode, etc. In some DSDA devices, the separate RF resources that are assigned to each SIM may be limited to the receive chain, with the SIMs configured to share a single transmit chain. Other multi-SIM wireless communication devices may be configured to operate more than two SIMs in simultaneous active connections, such as by providing a separate transceiver for each of at least three SIMs.

The SIMs in a multi-SIM wireless communication device may be associated with the same or different PLMNs, each of which may have more than one wireless network. Each SIM is generally provisioned by a service provider with a list of preferred PLMNs from which the wireless communication device can receive service (i.e., a home PLMN and roaming partner PLMNs). In some embodiments, the wireless device processor may access non-volatile memory associated with a given one of the SIMs to identify supported radio access technologies, and the corresponding enabled frequency bands (and ARFCNs/UARFCNs/channels in each band).

Although multi-SIM wireless communication devices offer a variety of options to the end user, they also necessitate efficient execution of complex tasks. Further, as wireless communication networks become more pervasive and the number of subscribers continues to increase, wireless bandwidth becomes increasingly scarce. To mitigate this problem, advanced voice compression techniques are used to reduce the bandwidth needed by each voice call. Such compression is typically performed using encoder/decoders ("codecs") such as the GSM adaptive multi-rate (AMR), AMR Wideband (AMR-WB) and enhanced full rate (EFR) codecs, and the CDMA enhanced variable rate codec (EVRC). Codecs typically operate on a collection of samples, which are compressed and sent as a frame of data. Some codecs, for example, divide a voice call into 20 ms time periods, sending a frame of voice data once every 20 ms.

In a DSDA device, if both SIMs are participating in a voice call, one call proceeds as active, while the other is put in a held state for the user. Operations by the modem stack associated with the SIM of the held call are typically limited to control and mobility information, which may be afforded priority in case of a transmission conflict with data in the active voice call. That is, since only one call is active, there are no conflicts between data traffic on different SIMs.

However, if one SIM is participating in a voice call and the other SIM is participating in another active communication (e.g., a data session), data traffic conflicts may arise, such as from uplink voice traffic and uplink or downlink data packets. Such conflicts are typically resolved in favor of the voice call, which is considered to be a higher priority communication since maintaining the connection typically requires high throughput and quality, and very low latency. As a result the lower priority data session may repeatedly delay or cancel uplink packets, and receive packets on a delayed or noisy downlink connection. Due to this degradation of performance in the lower priority data session, the wireless device may expend additional power to try to maintain the network connection and/or mitigate advertise affects from the voice call.

Figure 1:
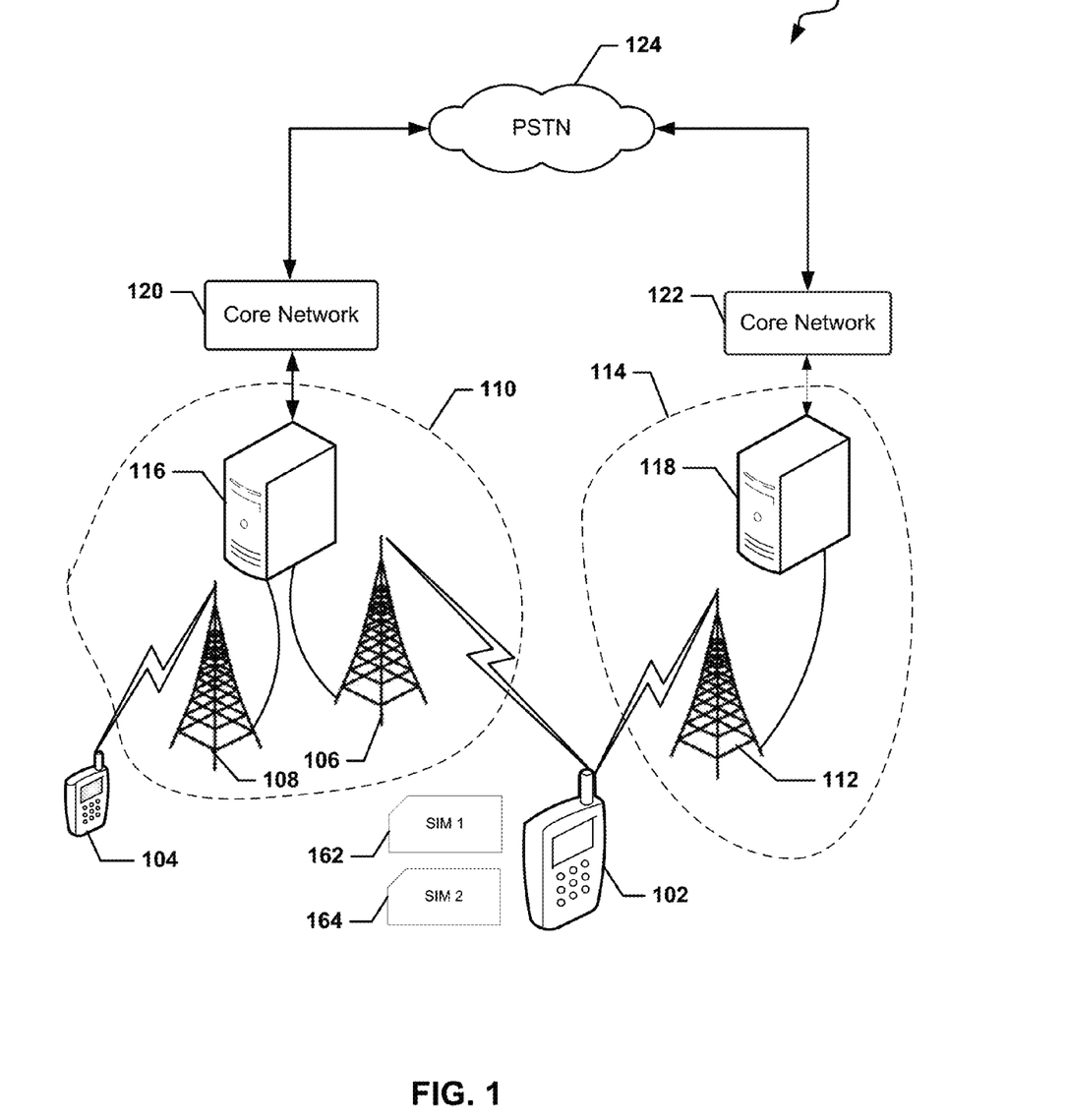
FIG. 1 is a communication system block diagram of a network suitable for use with various embodiments.

FIG. 1 illustrates a wireless network system 100 suitable for use with various embodiments. A first wireless device 102 and a second wireless device 104 may each be configured to establish wireless connections with cell towers or base stations of one or more radio access networks. For example, the wireless devices 102, 104 may transmit/receive data using a first base station 106 and a second base station 108, each of which may be part of a first network 110, as is known in the art. The first wireless device 102 may further be configured to transmit/receive data through a third base station 112, which may be part of a second network 114.

The networks 110, 114 may be cellular data networks, and may use channel access methods including, but not limited to, Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), Wi-Fi, PCS, or other protocols that may be used in a wireless communications network or a data communications network. The networks 110, 114 may use the same or different wireless interfaces and/or physical layers. In some embodiments, the base stations 106, 108, 112 may be controlled by one or more base station controllers (BSC) (e.g., a first BSC 116 and a second BSC 118). For example, the base stations 106, 108, the first BSC 116, and other components may form the first network 110, as is known in the art. Alternate network configurations may also be used and the embodiments are not limited to the configuration illustrated. For example, in another embodiment the functionality of the first BSC 116 and at least one of the base stations 106, 108 may be collapsed into a single "hybrid" module having the functionality of these components.

In various embodiments, the first wireless device 102 may simultaneously access multiple core networks (e.g., a first core network 120 and a second core network 122) after camping on cells managed by the base stations 106, 112. The first wireless device 102 may also establish connections with Wi-Fi access points (not shown), which may connect to the Internet. While various embodiments are particularly useful with wireless networks, the embodiments are not limited to wireless networks and may be implemented over wired networks with no changes to the methods.

In the wireless network system 100, the first wireless device 102 may be a multi-SIM wireless communication device that is capable of operating on a plurality of SIMs (e.g., a first SIM 162 and a second SIM 164). For example, the first wireless device 102 may be a dual-SIM wireless communication device. Using dual-SIM functionality, the first wireless device 102 may simultaneously access each of the core networks 120, 122 by camping on cells managed by the base stations 106, 112. The core networks 120, 122 may be interconnected by a public switched telephone network (PSTN) 124, across which the core networks 120, 122 may route various incoming and outgoing communications to the first wireless device 102.

The first wireless device 102 may make a voice or data call to a third party device, such as the second wireless device 104, using one of the SIMs 162, 164. The first wireless device 102 may also receive a voice call or other data transmission from a third party. The third party device (e.g., the second wireless device 104) may be any of a variety of devices, including, but not limited to, a mobile phone, laptop computer, PDA, server, etc.

Some or all of the wireless devices 102, 104 may be configured with multi-mode capabilities and may include multiple transceivers for communicating with different wireless networks over different wireless links/RATs. For example, the first wireless device 102 may be configured to communicate over multiple wireless data networks on different subscriptions, such as in a dual-SIM wireless device. In particular, the first wireless device 102 may be configured with dual-SIM dual-active (DSDA) capabilities, which may enable the first wireless device 102 to simultaneously participate in two independent communications sessions.

For clarity, while the techniques and embodiments described herein relate to a wireless device configured with at least one GSM subscription, they may be extended to subscriptions on other radio access networks (e.g., UMTS/WCDMA, LTE, CDMA, etc.).

Figure 2:
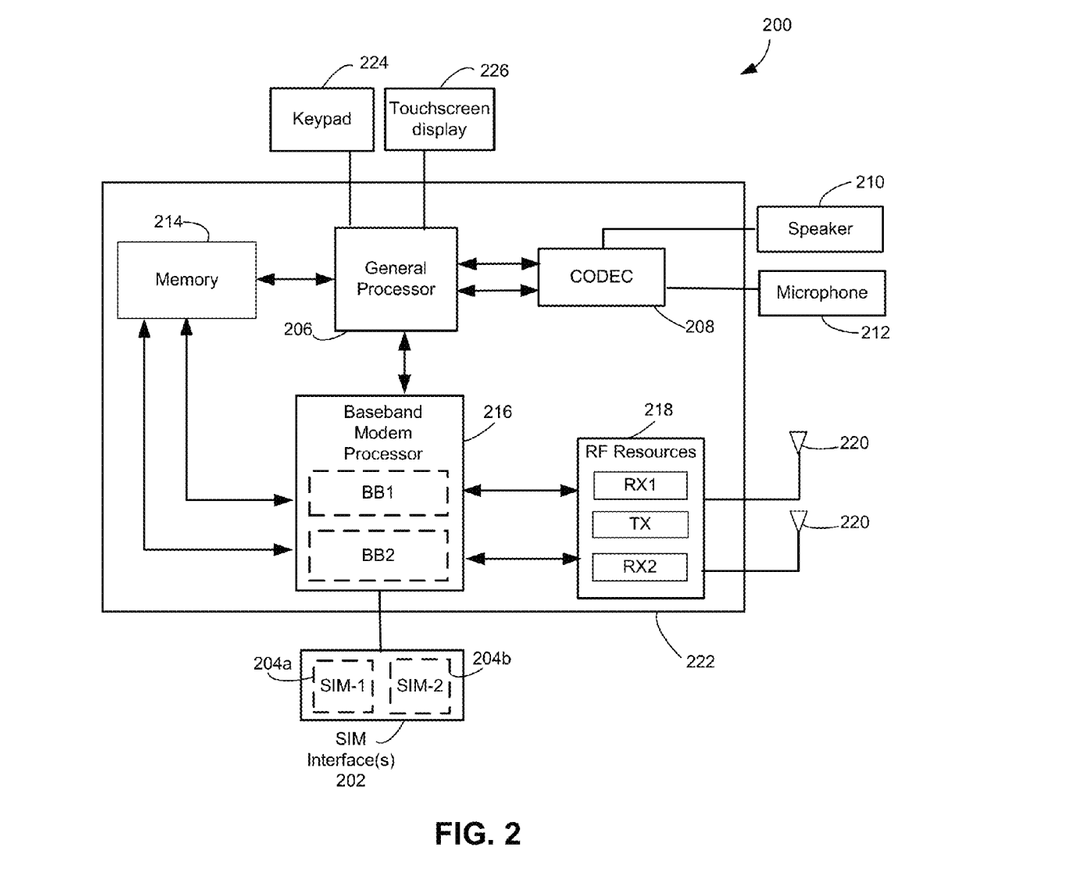
FIG. 2 is a block diagram illustrating a dual-SIM dual-active wireless communication device according to various embodiments.

FIG. 2 is a functional block diagram of a wireless device 200 suitable for implementing various embodiments. According to various embodiments, the wireless device 200 may be similar to one or more of the wireless devices 102, 104 as described above with reference to FIG. 1. With reference to FIGS. 1-2, the wireless device 200 may include a first SIM interface 202a, which may receive a first SIM 204a that is associated with a first subscription. The wireless device 200 may also include a second SIM interface 202b, which may receive a second SIM 204b that is associated with a second subscription.

A SIM in various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each of the SIM 204a, 204b may have a CPU, ROM, RAM, EEPROM and I/O circuits. One or more of the SIMs 204a, 204b used in various embodiments may contain user account information, an IMSI a set of SIM application toolkit (SAT) commands and storage space for phone book contacts. One or more of the SIMs 204a, 204b may further store home identifiers (e.g., a System Identification Number (SID)/Network Identification Number (NID) pair, a Home PLMN (HPLMN) code, etc.) to indicate the SIM network operator provider. An Integrated Circuit Card Identity (IC-CID) SIM serial number may be printed on one or more of the SIMs 204a, 204b for identification. However, a SIM may be implemented within a portion of memory of the wireless device 200 (e.g., memory 214), and thus need not be a separate or removable circuit, chip or card.

The wireless device 200 may include at least one controller, such as a general purpose processor 206, which may be coupled to one or more coder/decoder (CODEC) 208. The CODEC 208 may in turn be coupled to a speaker 210 and a microphone 212. The general purpose processor 206 may also be coupled to the memory 214.

The memory 214 may be a non-transitory tangible computer readable storage medium that stores processor-executable instructions. For example, the instructions may include routing communication data relating to the first or second subscription though a corresponding baseband-RF resource chain. The memory 214 may store operating system (OS), as well as user application software and executable instructions. The memory 214 may also store application data, such as an array data structure.

The general purpose processor 206 and memory 214 may each be coupled to at least one baseband modem processor 216. Each of the SIMs 204a, 204b in the wireless device 200 may be associated with a baseband-RF resource chain that may include the baseband modem processor 216—which may perform baseband/modem functions for communicating with/controlling a RAT—and one or more amplifiers and radios, referred to generally herein as RF resources 218. In some embodiments, baseband-RF resource chains may share the baseband modem processor 216 (i.e., a single device that performs baseband/modem functions for all SIMs on the wireless device 200). In other embodiments, each baseband-RF resource chain may include physically or logically separate baseband processors (e.g., BB1, BB2).

The RF resources 218 (also referred to herein as RF receive resources and RF transmit resources) may be coupled to at least two wireless antennas 220a, 220b, and may perform transmit and/or receive functions for the wireless services associated with each of the SIM 204a, 204b of the wireless device 200. In some embodiments, the RF resources 218 may be coupled to the wireless antennas 220a, 220b for sending and receiving RF signals for the SIMs 204a, 204b, thereby enabling the wireless device 200 to perform simultaneous communications with separate networks and/or services associated with the SIMs 204a, 204b. The RF resources 218 may provide separate transmit and receive functionality, or may include a transceiver that combines transmitter and receiver functions. In some embodiments, one or both of the wireless antennas 220a, 220b may each represent a plurality of antennas associated with each RF resource 218, such as to support diversity reception.

In some embodiments, the general purpose processor 206, the memory 214, the baseband modem processor(s) 216, and the RF resources 218 may be included in the wireless device 200 as a system-on-chip 222. In some embodiments, the first and second SIMs 204a, 204b and their corresponding interfaces 202a, 202b may be external to the system-on-chip 222. Further, various input and output devices may be coupled to components of the system-on-chip 222, such as interfaces or controllers. Example user input components suitable for use in the wireless device 200 may include, but are not limited to, a keypad 224 and a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or receive a telephone number. As another example, the request to initiate the outgoing call may be in the form of a voice command received via the microphone 212. Interfaces may be provided between the various software modules and functions in the wireless device 200 to enable communication between them, as is known in the art.

Functioning together, the two SIMs 204a, 204b, the baseband modem processor 216, the RF resources 218, and the wireless antennas 220a, 220b may constitute two or more RATs. For example, a SIM, baseband processor, and RF resource may be configured to support two different radio access technologies, such as GSM and WCDMA. More RATs may be supported on the wireless device 200 by adding more SIM cards, SIM interfaces, RF resources, and/or antennae for connecting to additional mobile networks.

Various embodiment wireless devices may have more than one antenna and/or other transmit chain components for performing transmit functions in an RF resource. The RF resources associated with a SIM may include one or more transmit chain, which may include, without limitation, components of the RF front end (including a transmitter unit), antennas, etc. The RF resources associated with a SIM may also include one or more receive chain that may include, without limitation, components of the RF front end, antennas, etc. In various embodiments, portions of the transmit and/or receive chains may be integrated into a single chip, or distributed over multiple chips. Also, a transmit chain, or portions of the transmit chain may be integrated into a chip along with other functions of the wireless device. The various embodiments may be used in wireless systems having a single transmit chain that makes up the RF transmit resource, and two or more antennas and/or receive chains that make up the RF receive resource(s).

In various embodiment networks, such as GSM networks, frequencies (e.g., ARFCNs) may be time divided into eight time slots, the sequence of which makes up a TDMA frame. TDMA frames may be grouped into multiframes based on the type of data that is sent to/received from the network. Further, on each timeslot within a particular multiframe, the TDMA frames may be allocated to logical channels that correspond to the type of data. Examples of such logical channels may include, for example, control channels (e.g., broadcast channels (BCH), common control channels (CCH), etc.) and traffic channels (TCH). Depending on the channel structure used by the base station subsystem, different time slots may carry different logical channels. In each timeslot, a maximum of 156.25 bits may be transmitted (i.e., a data burst).

In various embodiments, one or more SIMs may support active communications in a GSM network, which may involve sending and receiving encoded speech and/or data to and from the network in traffic channels (TCHs).

Figure 3:
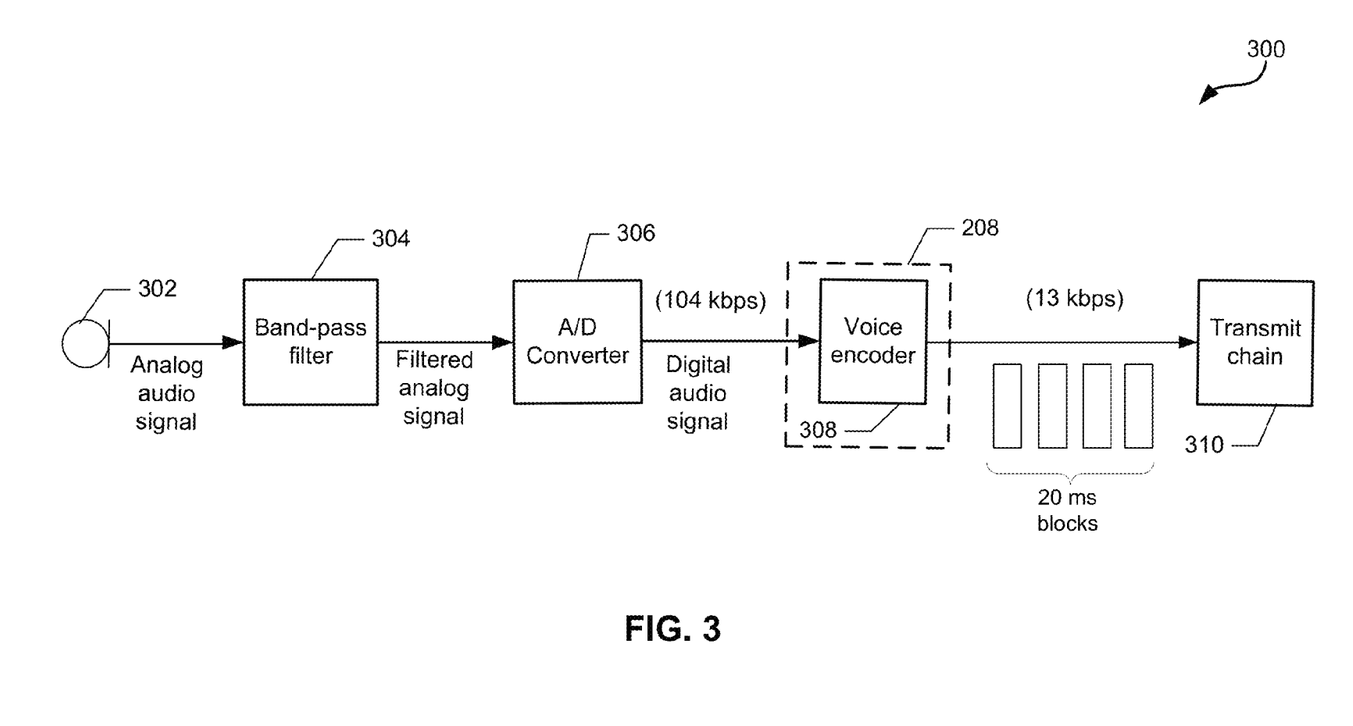
FIG. 3 is a block diagram illustrating an example configuration of components associated with uplink voice transmissions on a radio frequency (RF) transmit resource according to various embodiments.

FIG. 3 illustrates a configuration 300 of elements that may interact in a wireless device to generate encoded speech for uplink transmission on a TCH during an allocated timeslot. Referring to FIGS. 1-3, such elements in the configuration 300 may be functions and/or components of one of the wireless devices 102, 104, or 200, and may be associated with voice calls enabled on SIM-1 204a and/or SIM-2 204b. In the configuration 300 on a wireless communication device (e.g., 102, 200), a microphone 302 (e.g., 212) may convert an acoustic sound into an analog signal, which may be inputted into a band pass filter 304 in order to reduce the amount of data needed to represent the sound wave.

In various embodiments, the filtered analog signal may be input into an analog/digital (A/D) converter 306, which may convert the filtered analog signal into a digital audio signal. For example, the A/D converter 306 may measure the filtered analog signal by sampling, for example, at a rate of 8000 samples per second. In various embodiments, the A/D converter 306 samples may be quantified as 13-bit data blocks. Therefore, the A/D converter 306 may produce a digital audio signal having a data rate of 104 kilobits per second (kbps).

In various embodiments, components used in transmit circuitry (e.g., an RF transmit resource) may be unable to efficiently handle the relatively high rate of 104 kbps. Therefore, the data in the digital audio signal may be compressed by inputting the digital audio signal into a voice encoder (vocoder) 308 (e.g., part of the CODEC 208). The vocoder 308 may use any of a number of encoding schemes, depending on the capabilities/communication standards implemented by the network and the wireless device. Example vocoders supported by GSM include, but are not limited to, Regular Pulse Excitation and Linear Predictive Coding (RPE-LPC), Adaptive Multi-Rate (AMR), AMR Wideband (AMR-WB), etc. In various embodiments, the vocoder 308 may save and store in short-term memory 160 of the 13-bit samples taken by the A/D converter (i.e., 2080 bits total). Since samples are taken every 125 μs, in various embodiments the 160 samples may cover an audio block of 20 ms.

The vocoder 308 may utilize any of a number of different compression techniques that are known in the art to reduce the amount of data for each 20 ms block. In various embodiments, the resulting data compression may depend on the techniques used in the particular encoding scheme. For example, as shown in the configuration 300, the vocoder 308 may use RPE-LPC in full-rate (FR) channel mode to reduce the 2080 bits to 260 bits, thereby reducing the bitrate from 104 kbps to 13 kbps. In another example, the vocoder 308 may use RPE-LPC in half-rate (HR) channel mode to reduce the 2080 bits to 112 bits, thereby reducing the bitrate from 104 kbps to 5.6 kbps. In examples using AMR or AMR-WB, the vocoder 308 may select a channel mode (i.e., full-rate or half-rate) and codec mode (i.e., speech bitrate) according to present local radio conditions and capacity. In particular, the vocoder 308 may use AMR to reduce the bitrate from 104 kbps to one of a number of rates that range from 4.75 to 12.20 kbps.

The compressed audio data stream produced by the vocoder 308 may be subjected to error detection and correction processes (not shown) and may be passed to a transmit chain 310. Such error detection and correction processes (e.g., channel coding, interleaving, ciphering, etc.) may prevent degradation over the air interface during transmission.

In various embodiments, the transmit chain 310 may include any one or more components performing functions to route communication data associated with a particular SIM for transmission through a corresponding baseband-RF resource chain. In some embodiments, the transmit chain 310 may include functional components of the baseband-modem processor(s) 216 (e.g., BB1 or BB2), the TX unit of the RF resources 218, and one or more of the antennas 220a, 220b. One of the antennas 220a, 220b may be selected for use in transmission based on the configuration of the RF resource(s) 218, the network supported by the SIM, etc. In various embodiments, the transmit chain 310 may be shared between multiple SIMs. Other components known in the art of digital transceiver design may be implemented to condition signals for transmission, as part of the transmit chain 310.

With reference to FIGS. 1-3, separate units of a baseband-modem processor (e.g., 216) of a multi-SIM device (e.g., 200) may be implemented as separate structures or as separate logical units within the same structure, and may be configured to execute software including at least two protocol stacks/modem stacks associated with at least two SIMs, respectively. The SIMs and associated modem stacks may be configured to support a variety of communication services that fulfill different user requirements. Further, a particular SIM may be provisioned with information to execute different signaling procedures for accessing a domain of the core network associated with these services and for handling data thereof.

While described with respect to GSM and/or UMTS networks, these are merely examples of networks to which serving cells for associated with the modem stacks of various embodiments may belong.

In various embodiments in which a wireless device (e.g., 200) is configured with multiple SIMs, each associated with independent RF receive resources and either independent RF transmit resources or a single shared RF transmit resource (e.g., a single-transmit DSDA device), performance improvements may be implemented by allowing cancellation (or "blanking") of some of the uplink transmissions of a voice call during good radio conditions in order to avoid conflicts with lower priority activities on another SIM. Since many networks employ error correction methods that enable wireless connections to tolerate TCH burst blanking when the conditions of the serving cell are favorable, the quality lost in the voice call from the TCH burst blanking may be relatively low compared to the performance improvements from the activities on another SIM.

In various embodiments, a wireless device (e.g., 200) may determine whether the voice call meets certain encoding criteria to permit TCH burst cancellation. In various embodiments, such encoding criteria may include that the voice codec used by the transmit circuitry is in a full-rate (FR) channel mode, and that a particular encoding technology is such that cancelled TCH bursts will not cause problems for the receiving device (i.e., the device of the other party to the voice call). If the encoding criteria are satisfied, a TCH burst cancellation scheme may be employed for the first SIM in order to specify a portion of the uplink TCH bursts in the voice call that may be blanked if needed. In some embodiments, the TCH burst cancellation scheme may involve downgrading one out of a number of TCH bursts. In some embodiments, a randomly selected one out of a number of TCH bursts may be downgraded. In some embodiments, a fixed periodic selection of one out of a number of TCH bursts may be downgraded. For example, the number of TCH bursts within TCH bursts are selected randomly for downgrading may be four, six and eight. Downgraded TCH bursts may be implemented by providing an indicator to each downgraded TCH burst, or maintaining an independent record of the downgraded TCH bursts. In some embodiments, the downgraded TCH bursts that conflict with lower-priority communication activities on another SIM may be cancelled if radio link criteria are satisfied (i.e., that the link is of sufficient quality to sustain loss of some random TCH bursts). In some embodiments, such radio link criteria may be a minimum signal strength of the serving cell connecting the voice call to a network supported by the first SIM.

Figure 4:
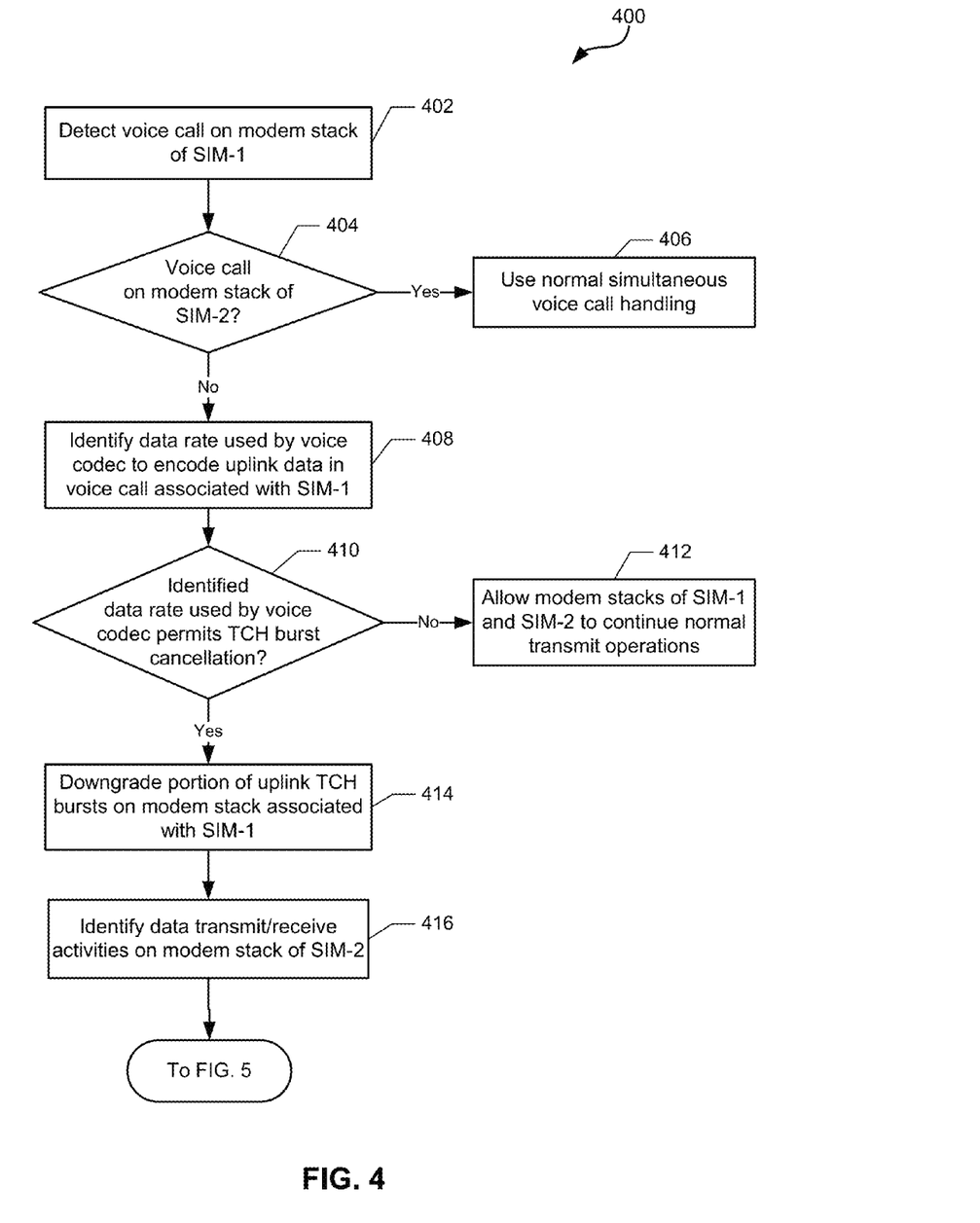
FIG. 4 is a process flow diagram illustrating a method for enabling a traffic channel (TCH) burst cancellation scheme for a SIM of a single-transmit DSDA device involved in simultaneous communication activities on an example dual-SIM wireless communication device according to various embodiments.

FIG. 4 illustrates a method 400 for improving efficiency and performance with respect to transmission on a multi-SIM multi-active (e.g., DSDA) wireless device (e.g., 102, 104, 200 in FIGS. 1-2) according to some embodiments. In various embodiments, the multi-SIM multi-active device may be configured with RF resources that include separate receive circuitries/RF receive resources for each SIM, and a single RF transmit resource that is shared between the multiple SIMs (e.g., a single-transmit DSDA device). In various embodiments, the operations of the method 400 may be implemented by one or more processors of the wireless device, such as the general purpose processor 206 in FIG. 2 and/or baseband modem processor(s) 216, or a separate controller (not shown) that may be coupled to memory (e.g., 214) and to the baseband modem processor(s) 216.

With reference to FIGS. 1-4, the wireless device processor may detect that a modem stack associated with a first SIM ("SIM-1") is participating in a voice call in block 402. In determination block 404, the wireless device processor may determine whether a modem stack associated with the second SIM ("SIM-2") is also participating in a voice call. The references to the first SIM (SIM-1) and the second SIM (SIM-2) are arbitrary and used merely for the purposes of describing the embodiments, and the wireless device processor may assign any indicator, name or other designation to differentiate the SIMs and associated modem stacks. Further, embodiment methods apply the same regardless of which SIM is involved in an active voice call.

The wireless device (e.g., 102, 104 in FIG. 1, 200 in FIG. 2) may have a layered software architecture to communicate with the first and second networks. The software architecture may be distributed among one or more baseband modem processor(s) 216, which may be part of and/or connected to the RF communication resources 218. In various embodiments, such a layered software architecture may include multiple protocol stacks, each of which may be associated with a different SIM. The protocol stacks may be implemented to allow modem operation using information provisioned on multiple SIMs. Therefore, a protocol stack that may be executed by a baseband modem processor is interchangeably referred to herein as a modem stack. While mediating transmission conflicts may depend on the particular radio access technologies of the network(s) carrying the calls, the RF resources of the wireless device, and the particular parameters of one or more voice codecs configured on the device, general SID frame scheduling may proceed according to the method 400.

In response to determining that the modem stack associated with the second SIM is also participating in a voice call (i.e., determination block 404="Yes"), the wireless device processor may use normal simultaneous voice call handling in block 406. That is, one of the simultaneous voice calls may be put in a held state while the other is active.

In response to determining that the modem stack associated with the second SIM is not participating in a voice call (i.e., determination block 404="No"), the wireless device processor may identify a data rate used by a voice codec to encode uplink data in the voice call associated with the first SIM in block 408. In various embodiments, such identification may be performed by identifying the particular voice code and mode and/or channel mode selected for use in the uplink. For example, the wireless device processor may identify a voice codec that operates at one fixed bit-rate in a full-rate channel mode, and at another fixed bit-rate in a half-rate channel mode. As such, the wireless device processor may identify the data rate by identifying the voice codec and the channel mode. In some embodiments, the wireless device processor may identify a voice codec that operates at variable speech bit-rates for each of the full-rate and half-rate channel modes. As such, the wireless device processor may identify the data rate by identifying the voice codec, the channel mode, and the speech bit-rate for that channel mode.

The wireless device processor may determine whether the identified data rate used by the voice codec permits TCH burst cancellation in determination block 410. For example, the wireless device processor may determine whether the voice codec is an AMR full-rate codec, AMR-WB full-rate codec, or RPE-LPC full-rate codec. In response to determining that the identified data rate does not permit TCH burst cancellation (i.e., determination block 410="No"), such as by determining that the voice codec is not an AMR full-rate codec, AMR-WB full-rate codec, or RPE-LPC full-rate codec, the wireless device processor may allow the modem stacks associated with the first and second SIMs to continue with normal transmit operations in block 412. That is, the wireless device processor may prioritize uplink TCH bursts associated with the first SIM over uplink data bursts associated with the second SIM.

In response to determining that the identified data rate permits TCH burst cancellation (i.e., determination block 410="Yes"), such as by determining that the voice codec is an AMR full-rate codec, AMR-WB full-rate codec, or RPE-LPC full-rate codec, the wireless device processor may downgrade portion of uplink TCH bursts scheduled for transmission on the modem stack associated with the first SIM in block 414. In some embodiments, the portion of downgraded TCH bursts may be a selection of one out of every four uplink TCH bursts. In other embodiments, the portion of downgraded TCH bursts may be selected using any frequency number of uplink TCH bursts (e.g., one out of every six, one out of every eight, etc., etc). The one-of-four, one-of-six, and one-of-eight uplink TCH bursts are provided merely as example portions selected for downgrading, and are not intended to limit the scope of the various embodiments. That is, one uplink TCH burst may be selected out of any number of uplink TCH bursts to achieve the desired portion to be downgraded. In some embodiments, the percentage of uplink TCH bursts that are downgraded may be dynamically selected based on the particular network or other factors. Such downgrading of TCH bursts in the voice call may be used to provide additional transmit and/or receive opportunities for the modem stack associated with the second SIM (e.g., in method 500 described with respect to FIG. 5). In block 416 the wireless device processor may identify the data transmit/receive activities on the modem stack associated with the second SIM (e.g., a packet data TCH (PDTCH) allocated to second SIM for a particular timeslot).

Figure 5:
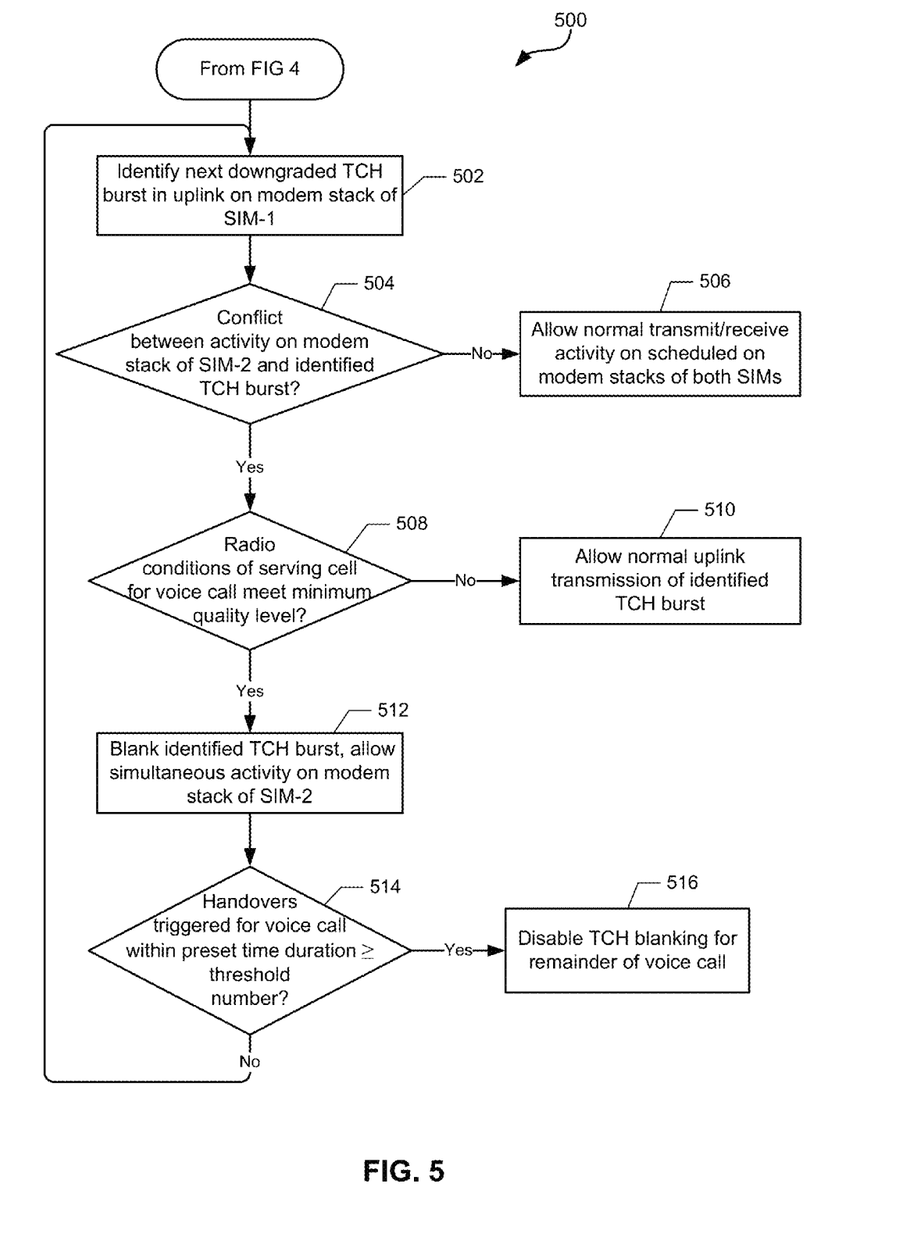
FIG. 5 is a process flow diagram illustrating a method of using the TCH burst cancellation method illustrated in FIG. 4 to reduce conflicts between communication activities on an example dual-SIM wireless communication device according to various embodiments.

FIG. 5 illustrates a transmission method 500 that may be implemented as a result of the TCH burst cancellation scheme applied to the first SIM method 400 in FIG. 4 (e.g., 414), in view of the identified data transmit/receive activities on the modem stack associated with the second SIM (e.g., 416). The operations of the method 500 may be implemented by one or more processors of the wireless device, such as the general purpose processor 206 in FIG. 2 and/or baseband modem processor(s) 216, or a separate controller (not shown) that may be coupled to memory (e.g., 214) and to the baseband modem processor(s) 216.

With reference to FIGS. 1-5, in block 502, the wireless device processor may identify a next downgraded TCH burst scheduled in the uplink for the voice call on the modem stack associated with the first SIM. In determination block 504, the wireless device processor may determine whether a conflict exists between transmit/receive activity on the modem stack associated with the second SIM and the identified TCH burst on the modem stack associated with the first SIM. Such conflicts may be, for example, an overlap in scheduling use of a shared RF transmit resource (e.g., TX unit in FIG. 2) for uplink TCH bursts associated with the first SIM and uplink data associated with the second SIM (e.g., packet data TCH (PDTCH) bursts). Other conflicts may include, for example, a high loss of sensitivity (i.e., desense) to the receive chain associated with the second SIM due to simultaneous use of a transmit chain by the modem stack associated with the first SIM. In various embodiments, such transmit chain may include components of a shared RF transmit resource (e.g., in a single-transmit DSDA device) or of a dedicated RF transmit resource (e.g., in other DSDA devices).

In response to determining that no conflict exists between the transmit/receive activity on the modem stack associated with the second SIM and the identified TCH burst (i.e., determination block 504="No"), the wireless device processor may allow the modem stacks associated with both SIMs to proceed with normal transmit and receive activity in block 506.

In response to determining that a conflict exists between transmit/receive activity on the modem stack associated with the second SIM and the identified TCH burst on the modem stack associated with the first SIM (i.e., determination block 504="Yes"), the wireless device processor may determine whether radio conditions of the serving cell for the voice call meet a minimum quality level in determination block 508. For example, the wireless device processor may compute a received signal power level based on the average of the received signal strengths measured during a preceding set of TCH multiframes. In some embodiments, the received power level value may be a RXLEV_FULL parameter, which is based on received signal strength measurements for a full set of TCH and SACCH TDMA frames in the preceding four TCH multiframes. In other embodiments, the received power level may be a RXLEV_SUB parameter, which is based on received signal strength measurements for a sub-set of SACCH and SID_UPDATE TDMA frames in the preceding four TCH multiframes. In various embodiments, the received signal power level may be compared to a minimum quality level in determination block 508.

In response to determining that the radio conditions of the serving cell for the voice call do not meet the minimum quality level (i.e., determination block 508="No"), the wireless device processor may allow normal uplink transmission of the next downgraded TCH burst on the modem stack associated with the first SIM in block 510. In some embodiments, the wireless device processor may determine that the radio conditions do not meet the minimum quality level by determining that the received signal power level (e.g., RXLEV_FULL or RXLEV_SUB parameter value) is lower than the minimum quality level, which corresponds to a particular average received signal strength (e.g., −90 dBm).

In response to determining that the radio conditions of the serving cell for the voice call are sufficiently good (i.e., determination block 508="Yes"), the wireless device processor may cancel or "blank" (i.e., reduce transmit power to zero) the identified TCH burst while allowing performance of the transmit/receive activity scheduled on the modem stack associated with the second SIM in block 512.

In various embodiments, the modem stack associated with the first SIM may track each handover triggered by the serving cell to reselect to a new cell for the voice call. Such tracking may be performed, for example, in the physical layer (e.g., GSM Layer 1, described in standards document GSM 04.04 version 5.0.1 standard), by incrementing a counter for each handover triggered during the voice call. In determination block 514, the wireless device processor may determine whether the number of handovers that have been triggered for the voice call within a preset time duration is greater than or equal to a threshold number. For example, the threshold number may be set to three and the preset time duration may be set to one minute. In some embodiments, the wireless device processor may be configured to automatically receive a notification each time the counter is incremented, or to receive a notification once the counter reaches the threshold number or a multiple thereof (e.g., after three handovers, after six handovers, etc.). In some embodiments, the wireless device processor may have a countdown timer for the preset time duration (e.g., one minute), and may query the first modem after each expiration of the countdown timer. In various embodiments, the threshold number of handovers and preset time duration may be configured by the serving cell network, and stored in the SIM or other storage in the wireless device.

In response to determining that the number of handovers that have been triggered for the voice call within the preset time duration is greater than or equal to the threshold number (i.e., determination block 514="Yes"), the wireless device processor may disable blanking of the downgraded TCH bursts for the remainder of the voice call in block 516. In this manner, the wireless device processor may adjust for high mobility and/or poor signal strength conditions in which the effects of TCH blanking may become noticeable to the user of the wireless communication device and/or the called party. The wireless device processor may again identify the next downgraded TCH burst in the uplink on the modem stack associated with the first SIM in block 502 to repeat method 500 so long as the number of handovers triggered within the preset time duration is less than the threshold number.

In response to determining that the number of handovers that have been triggered for the voice call within the preset time duration is less than the threshold number (i.e., determination block 514="No"), the wireless device processor may again identify the next downgraded TCH burst in the uplink on the modem stack associated with the first SIM in block 502 to repeat the method 500 so long as the number of handovers triggered within the preset time duration is less than the threshold number.

As discussed, the references to first SIM/SIM-1 and second SIM/SIM-2, as well as first and second modem stacks, are arbitrary, and may apply to either or any SIM or associated functions implemented by a processor and/or RF resource(s). Further, such designations of SIMs and/or modem stacks may be switched or reversed between instances of executing the methods herein.

Figure 6:
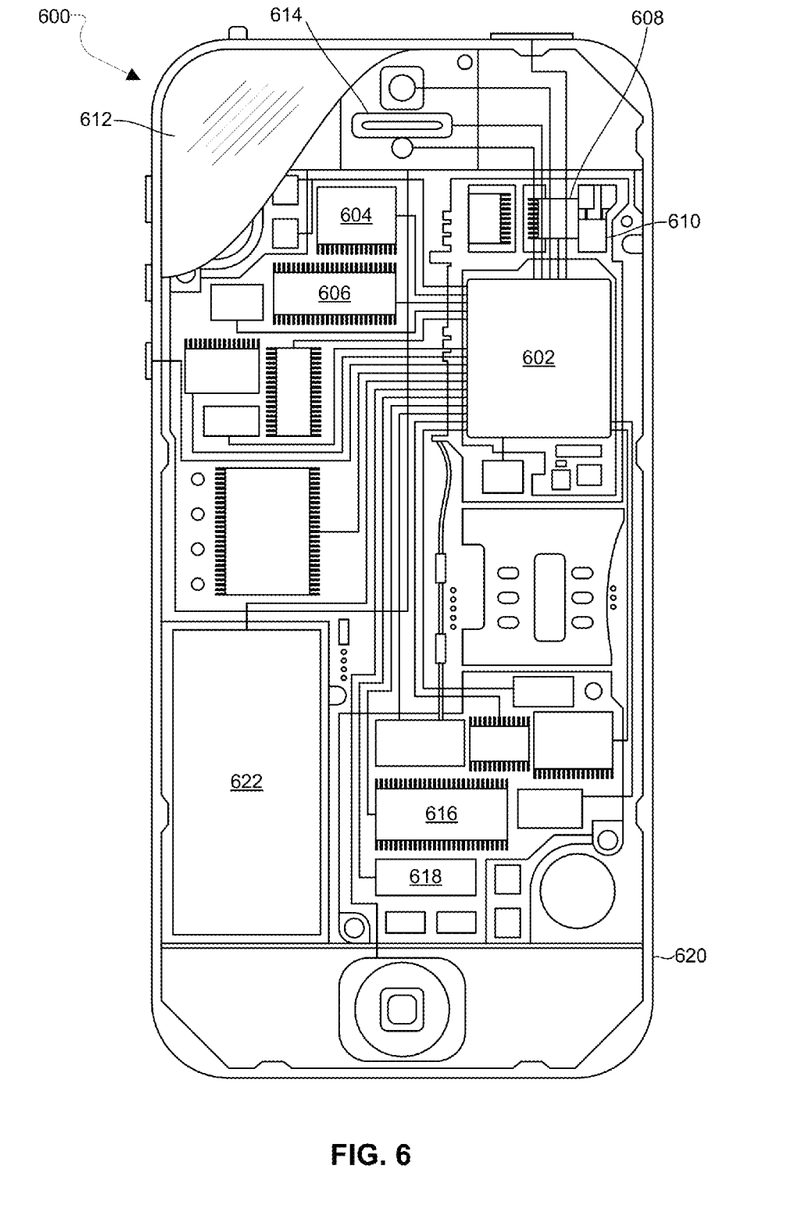
FIG. 6 is a component diagram of an example wireless device suitable for use with various embodiments.

The various embodiments (including, but not limited to, embodiments discussed above with reference to FIGS. 4 and 5) may be implemented in any of a variety of wireless devices, an example 600 of which is illustrated in FIG. 6. For example, the wireless device 600 (which may correspond, for example, the wireless devices 102, 104, 200 in FIGS. 1-2) may include a processor 602 coupled to a touchscreen controller 604 and an internal memory 606. The processor 602 may be one or more multicore integrated circuits (ICs) designated for general or specific processing tasks. The internal memory 606 may be volatile or non-volatile memory, and may also be secure and/or encrypted memory, or unsecure and/or unencrypted memory, or any combination thereof.

The touchscreen controller 604 and the processor 602 may also be coupled to a touchscreen panel 612, such as a resistive-sensing touchscreen, capacitive-sensing touchscreen, infrared sensing touchscreen, etc. The wireless device 600 may have one or more radio signal transceivers 608 (e.g., Peanut®, Bluetooth®, Zigbee®, Wi-Fi, RF radio) and antennae 610, for sending and receiving, coupled to each other and/or to the processor 602. The transceivers 608 and antennae 610 may be used with the above-mentioned circuitry to implement the various wireless transmission protocol stacks and interfaces. The wireless device 600 may include a cellular network wireless modem chip 616 that enables communication via a cellular network and is coupled to the processor. The wireless device 600 may include a peripheral device connection interface 618 coupled to the processor 602. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port (not shown). The wireless device 600 may also include speakers 614 for providing audio outputs. The wireless device 600 may also include a housing 620, constructed of a plastic, metal, or a combination of materials, for containing all or some of the components discussed herein. The wireless device 600 may include a power source 622 coupled to the processor 602, such as a disposable or rechargeable battery. The rechargeable battery may also be coupled to the peripheral device connection port to receive a charging current from a source external to the wireless device 600.

Figure 7:
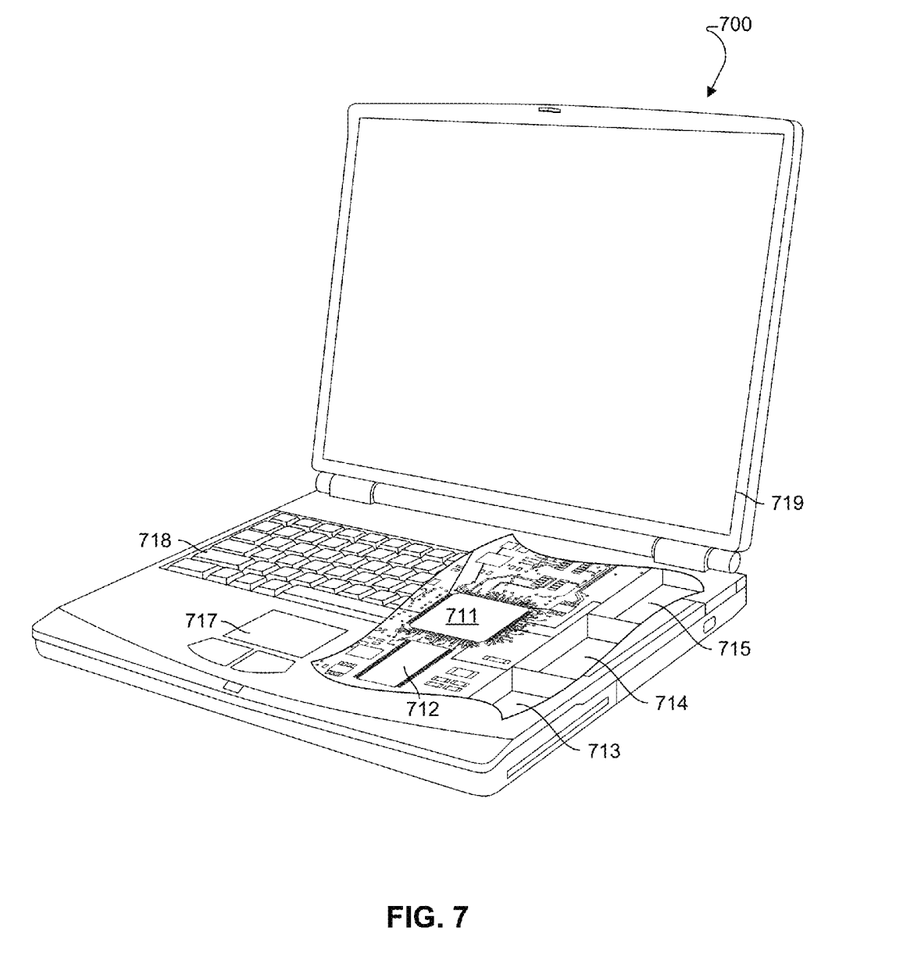
FIG. 7 is a component diagram of another example wireless device suitable for use with various embodiments.

The various embodiments described above (including, but not limited to, embodiments discussed above with reference to FIGS. 4 and 5) may also be implemented within a variety of personal computing devices, such as a laptop computer 700 as illustrated in FIG. 7. Many laptop computers include a touchpad touch surface 717 that serves as the computer's pointing device, and thus may receive drag, scroll, and flick gestures similar to those implemented on wireless computing devices equipped with a touch screen display and described above. The laptop computer 700 will typically include a processor 711 coupled to volatile memory 712 and a large capacity nonvolatile memory, such as a disk drive 713 of Flash memory. The laptop computer 700 may also include a floppy disc drive 714 and a compact disc (CD) drive 715 coupled to the processor 711. The laptop computer 700 may also include a number of connector ports coupled to the processor 711 for establishing data connections or receiving external memory devices, such as a USB or FireWire® connector sockets, or other network connection circuits for coupling the processor 711 to a network. In a notebook configuration, the computer housing includes the touchpad touch surface 717, the keyboard 718, and the display 719 all coupled to the processor 711. Other configurations of the computing device may include a computer mouse or trackball coupled to the processor (e.g., via a USB input) as are well known, which may also be use in conjunction with various embodiments.

The processors 602 and 711 may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 606, 712 and 713 before they are accessed and loaded into the processors 602 and 711. The processors 602 and 711 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 602, 711, including internal memory or removable memory plugged into the device and memory within the processor 602 and 711, themselves.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of improving performance of a multi-subscriber identification module (multi-SIM) wireless communication device having at least a first SIM associated with a first radio frequency (RF) receive resource and a second SIM associated with a second RF receive resource, the method comprising:
    detecting, via a processor, a voice communication on a modem stack associated with the first SIM and a data communication on a modem stack associated with the second SIM;
    identifying, via the processor, a data rate used by a voice codec to encode uplink traffic channel (TCH) bursts in the voice communication;
    determining, via the processor, whether the identified data rate used by the voice codec permits TCH burst cancellation based on determining whether the voice codec is one of an Adaptive Multi-rate (AMR) full-rate codec, an AMR Wideband (AMR-WB) full-rate codec, and a Regular Pulse Excited-Linear Predictive Coding (RPE-LPC) full-rate codec; and
    downgrading, via the processor, a portion of the uplink TCH bursts scheduled on the modem stack associated with the first SIM in response to determining that the identified data rate used by the voice codec permits TCH burst cancellation.

2. The method of claim 1, further comprising:
    identifying, via the processor, a next downgraded uplink TCH burst scheduled on the modem stack associated with the first SIM;

determining, via the processor, whether the identified downgraded uplink TCH burst conflicts with the data communication on the modem stack associated with the second SIM; and detecting, via the processor, radio conditions of a serving cell for the voice communication in response to determining that the identified downgraded uplink TCH burst conflicts with the data communication on the modem stack associated with the second SIM.

3. The method of claim 2, further comprising:

determining, via the processor, whether the detected radio conditions of the serving cell for the voice communication indicate a received signal strength that is above a minimum value; and cancelling, via the processor, the identified downgraded uplink TCH burst in response to determining that the detected radio conditions of the serving cell for the voice communication indicate a signal strength above the minimum value, wherein cancelling the identified downgraded uplink TCH burst enables activity in the data communication on the modem stack associated with the second SIM.

4. The method of claim 3, further comprising:

allowing, via the processor, normal transmission of the identified downgraded uplink TCH burst in response to determining that the detected radio conditions of the serving cell for the voice communication indicate a signal strength that is not above the minimum value.

5. The method of claim 3, further comprising:

tracking, via the processor, each handover triggered for the voice communication;

identifying, via the processor, a threshold number of handovers and a preset time duration;

determining, via the processor, whether a count of handovers triggered for the voice communication within the preset time duration is greater than or equal to the threshold number; and disabling, via the processor, cancellation of uplink TCH bursts for a remainder of the voice communication in response to determining that the count of handovers triggered for the voice communication within the preset time duration is greater than or equal to the threshold number.

6. The method of claim 2, wherein determining whether the identified downgraded uplink TCH burst conflicts with the data communication on the modem stack associated with the second SIM comprises:

identifying, via the processor, transmit and receive activities of the data communication scheduled on the modem stack associated with the second SIM;

determining, via the processor, whether any scheduling collisions will occur; and determining, via the processor, whether receiver desense will occur.

7. The method of claim 6, wherein determining whether any scheduling collisions will occur comprises determining whether any identified transmit activity is scheduled to occur at the same time as the identified downgraded uplink TCH burst, wherein the first and second SIMs are associated with a shared RF transmit resource.

8. The method of claim 6, wherein determining whether receiver desense will occur comprises determining whether any identified receive activity is scheduled to occur at the same time as the identified downgraded uplink TCH burst.

9. The method of claim 1, wherein the portion of the uplink TCH bursts comprises a selected one uplink TCH burst out of every four uplink TCH bursts of the voice communication.

10. The method of claim 1, wherein the portion of the uplink TCH bursts comprises a selected one uplink TCH burst out of every 5-8 uplink TCH bursts of the voice communication.

11. The method of claim 1, wherein the portion of the uplink TCH bursts is based on a random selection.

12. The method of claim 1, wherein the portion of the uplink TCH bursts is based on a fixed periodic selection.

13. A wireless communication device, comprising:

a first radio frequency (RF) receive resource configured to connect to a first subscriber identity module (SIM);

a second RF receive resource configured to connect to a second SIM;

a processor coupled to the first and second RF receive resources and configured with processor-executable instructions to:

detect a voice communication on a modem stack associated with the first SIM and a data communication on a modem stack associated with the second SIM;

identify a data rate used by a voice codec to encode uplink traffic channel (TCH) bursts in the voice communication;

determine whether the identified data rate used by the voice codec permits TCH burst cancellation based on determining whether the voice codec is one of an Adaptive Multi-rate (AMR) full-rate codec, an AMR Wideband (AMR-WB) full-rate codec, and a Regular Pulse Excited-Linear Predictive Coding (RPE-LPC) full-rate codec; and downgrade a portion of the uplink TCH bursts scheduled on the modem stack associated with the first SIM in response to determining that the identified data rate used by the voice codec permits TCH burst cancellation.

14. The wireless communication device of claim 13, wherein the processor is further configured with processor-executable instructions to:

identify a next downgraded uplink TCH burst scheduled on the modem stack associated with the first SIM;

determine whether the identified downgraded uplink TCH burst conflicts with the data communication on the modem stack associated with the second SIM; and detect radio conditions of a serving cell for the voice communication in response to determining that the identified downgraded uplink TCH burst conflicts with the data communication on the modem stack associated with the second SIM.

15. The wireless communication device of claim 14, wherein the processor is further configured with processor-executable instructions to:

determine whether the detected radio conditions of the serving cell for the voice communication indicate a received signal strength that is above a minimum value; and cancel the identified downgraded uplink TCH burst in response to determining that the detected radio conditions of the serving cell for the voice communication indicate a signal strength above the minimum value, wherein cancelling the identified downgraded uplink TCH burst enables activity in the data communication on the modem stack associated with the second SIM.

16. The wireless communication device of claim 15, wherein the processor is further configured with processor-executable instructions to:
  allow normal transmission of the identified downgraded uplink TCH burst in response to determining that the detected radio conditions of the serving cell for the voice communication indicate a signal strength that is not above the minimum value.

17. The wireless communication device of claim 15, wherein the processor is further configured with processor-executable instructions to:
  track each handover triggered for the voice communication;
  identify a threshold number of handovers and a preset time duration;
  determine whether a count of handovers triggered for the voice communication within the preset time duration is greater than or equal to the threshold number; and
  disable cancellation of uplink TCH bursts for a remainder of the voice communication in response to determining that the count of handovers triggered for the voice communication within the preset time duration is greater than or equal to the threshold number.

18. The wireless communication device of claim 14, wherein the processor is further configured with processor-executable instructions to determine whether the identified downgraded uplink TCH burst conflicts with the data communication on the modem stack associated with the second SIM by:
  identifying transmit and receive activities of the data communication scheduled on the modem stack associated with the second SIM;
  determining whether any scheduling collisions will occur; and
  determining whether receiver desense will occur.

19. The wireless communication device of claim 18, wherein the processor is further configured with processor-executable instructions to determine whether any scheduling collisions will occur by determining whether any identified transmit activity is scheduled to occur at the same time as the identified downgraded uplink TCH burst, wherein the first and second SIMs are associated with a shared RF transmit resource.

20. The wireless communication device of claim 18, wherein the processor is further configured with processor-executable instructions to determine whether receiver desense will occur by determining whether any identified receive activity is scheduled to occur at the same time as the identified downgraded uplink TCH burst.

21. The wireless communication device of claim 13, wherein the portion of the uplink TCH bursts comprises a selected one uplink TCH burst out of every four uplink TCH bursts of the voice communication.

22. The wireless communication device of claim 13, wherein the portion of the uplink TCH bursts comprises a selected one uplink TCH burst out of every 5-8 uplink TCH bursts of the voice communication.

23. The wireless communication device of claim 13, wherein the portion of the uplink TCH bursts is based on a random selection.

24. The wireless communication device of claim 13, wherein the portion of the uplink TCH bursts is based on a fixed periodic selection.

25. A wireless communication device, comprising:
  a first radio frequency (RF) receive resource configured to connect to a first subscriber identity module (SIM);
  a second RF receive resource configured to connect to a second SIM;
  means for detecting a voice communication on a modem stack associated with the first SIM and a data communication on a modem stack associated with the second SIM;
  means for identifying a data rate used by a voice codec to encode uplink traffic channel (TCH) bursts in the voice communication;
  means for determining whether the identified data rate used by the voice codec permits TCH burst cancellation, comprising:
    means for determining whether the voice codec is one of an Adaptive Multi-rate (AMR) full-rate codec, an AMR Wideband (AMR-WB) full-rate codec, and a Regular Pulse Excited-Linear Predictive Coding (RPE-LPC) full-rate codec; and
  means for downgrading a portion of the uplink TCH bursts scheduled on the modem stack associated with the first SIM in response to determining that the identified data rate used by the voice codec permits TCH burst cancellation.

26. A non-transitory processor-readable storage medium having stored thereon processor-executable instructions configured to cause a processor of a wireless communication device having first and second radio frequency (RF) receive resources associated with respective first and second subscriber identity modules (SIMs) to perform operations comprising:
  detecting a voice communication on a modem stack associated with the first SIM and a data communication on a modem stack associated with the second SIM;
  identifying a data rate used by a voice codec to encode uplink traffic channel (TCH) bursts in the voice communication;
  determining whether the identified data rate used by the voice codec permits TCH burst cancellation based on determining whether the voice codec is one of an Adaptive Multi-rate (AMR) full-rate codec, an AMR Wideband (AMR-WB) full-rate codec, and a Regular Pulse Excited-Linear Predictive Coding (RPE-LPC) full-rate codec; and
  downgrading a portion of the uplink TCH bursts scheduled on the modem stack associated with the first SIM in response to determining that the identified data rate used by the voice codec permits TCH burst cancellation.

* * * * *